US005819949A

United States Patent [19]

Schaaf et al.

[11] Patent Number: 5,819,949

[45] Date of Patent: Oct. 13, 1998

[54] APPARATUS FOR SEPARATING MAGNETIC MATERIAL AND METHOD

[75] Inventors: William R. Schaaf, Taylors; Ray R. Arel, Anderson, both of S.C.

[73] Assignee: Insul-Magnetics, Taylors, S.C.

[21] Appl. No.: 754,874

[22] Filed: Nov. 22, 1996

[51] Int. Cl.[6] ................................ B03C 1/00; F16B 1/00

[52] U.S. Cl. ....................... 209/223.2; 209/228; 403/321; 403/348

[58] Field of Search ................................ 209/223.1, 213, 209/223.2, 228, 636; 403/321, 348; 292/256, 256.5

[56] References Cited

U.S. PATENT DOCUMENTS

| | | | |
|---|---|---|---|
| 4,333,825 | 6/1982 | Wyland et al. | 209/223.2 |
| 5,186,333 | 2/1993 | Pierson et al. | 292/256 X |
| 5,427,249 | 6/1995 | Schaaf | 209/223.2 |
| 5,470,466 | 11/1995 | Schaaf | 209/223.2 X |
| 5,660,493 | 8/1997 | Stephens | 403/348 |

FOREIGN PATENT DOCUMENTS

| | | | |
|---|---|---|---|
| 3307319 | 9/1984 | Germany | 209/223.2 |

*Primary Examiner*—Tuan N. Nguyen

[57] ABSTRACT

A closure operator member (E) is urged by a fastening member (F) extending across opposed brackets (D) into sealing relation across an opening in an end member (C) extending about a tubular housing (B) for receiving a bar magnet (A). A camming action or wedging is achieved thereby exerting a compressive force against a deformable sealing member. A mounting apparatus includes opposed transversely spaced longitudinal brackets (H) which are pivotally adjustable at (I) for providing support locations for elongated bar magnets (A).

12 Claims, 4 Drawing Sheets

APPARATUS FOR SEPARATING MAGNETIC MATERIAL AND METHOD

BACKGROUND OF THE INVENTION

This invention relates to apparatus and method for separating magnetic material utilizing bar magnets carried within tubular housings constructed from non-magnetic material having improved closure operators for isolating the bar magnets within the housings away from contamination to facilitate removal of magnetic material collected on the housings, and to adjustably positioning elongated magnets.

The prior art is represented by U.S. Pat. Nos. 5,427,249 and 5,470,466 which illustrate assemblies wherein elongated bar magnets are carried within housings constructed of non-metallic material with a closure operator including a seal insuring protection for the bar magnets against contamination by liquid or gaseous fluid or magnetic particles contained therein. It is desirable to provide a tubular housing constructed of non-metallic material containing bar magnets of any reasonably desirable length and to provide a closure operator which maybe readily and positively secured across an open end of the housing.

It would also be desirable to provide mounting apparatus and method capable of adjustably positioning a number of aligned elongated bar magnets so that the distances between the bar magnets may be easily varied.

It is an important characteristic of assemblies contemplated by the invention that they be readily cleanable to remove tramp metal or other magnetic objects adhering thereto. It is also a desirable feature of the invention that a variety of separated or particulate matter containing magnetic material be able to flow by gravity or be otherwise fed past the magnets within their magnetic field for separation or removal of magnetic material. It is also important to provide for removal of magnetic material from other materials including webs guided and fed past and out of contact with the magnets.

SUMMARY OF THE INVENTION

An object of this invention is to provide an improved apparatus and method for separating magnetic from non-magnetic materials utilizing bar magnets.

It is an important object of the invention to provide closure structure and method for securing elongated bar magnets utilized in separating magnetic material from non-magnetic material within tubular housings for readily effecting the closure and for assuring an effective seal against contamination of the bar magnets.

An improved closure is achieved by providing a fastening member engaging a pair of opposed brackets carried by the end member with an open end of the tubular housing therebetween so as to retain a closure member across the open end of the tubular housing. A mounting member carries the fastening member for rotation from a position engaging the brackets to a disengaged position free of the brackets permitting withdrawal of the elongated magnet from the housing.

Preferably a camming action is achieved by camming surfaces at respective ends of the moveable fastening member which engage the brackets in locking relationship urging the closure member into sealing relation with a deformable sealing member which encompasses the elongated magnet at an opening end of the elongated housing. A stop member is carried by the closure member to limit rotation of the moveable fastening on the mounting member so as to provide locking engagement between the fastening member and the interengaging surfaces of the brackets.

A mounting arrangement comprising longitudinally disposed horizontally aligned brackets is provided for positioning elongated magnets between the brackets and which are provided with means for pivotally adjusting the brackets for mounting the magnets in transverse alignment and in adjustable spaced relation, such as upon a cloth inspecting machine or in any other location where a web or stream of separated material containing magnetic components passes between the magnets within their magnetic fields.

Another important object of the invention is to exert a clamping and sealing action in one motion.

Any suitable non-magnetic material may be utilized for the major components such as aluminum, stainless steel or other non-magnetic material depending upon desired characteristics to be achieved.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate apparatus for separating magnetic material including at least one elongated bar magnet A. A tubular housing, which is constructed from non-magnetic material, contains the elongated bar magnet B. An end member C extends in sealed relation to the housing defining an open end of the tubular housing and presenting a marginal outer surface. Opposed brackets D are carried by the end member on the marginal surface with an open end of the tubular housing therebetween. A closure operator member E is fixed to the bar magnet presenting an inner surface extending across the open end of the tubular housing. A fastening member F forcefully retains the closure member across the open end of the tubular housing preferably through a camming or a wedging action. A mounting member G carries the camming member for rotation from a position wherein the camming member engages the brackets to a position wherein the camming member is free of engagement with the brackets permitting withdrawal of a bar magnet from a tubular housing.

Figure 4:
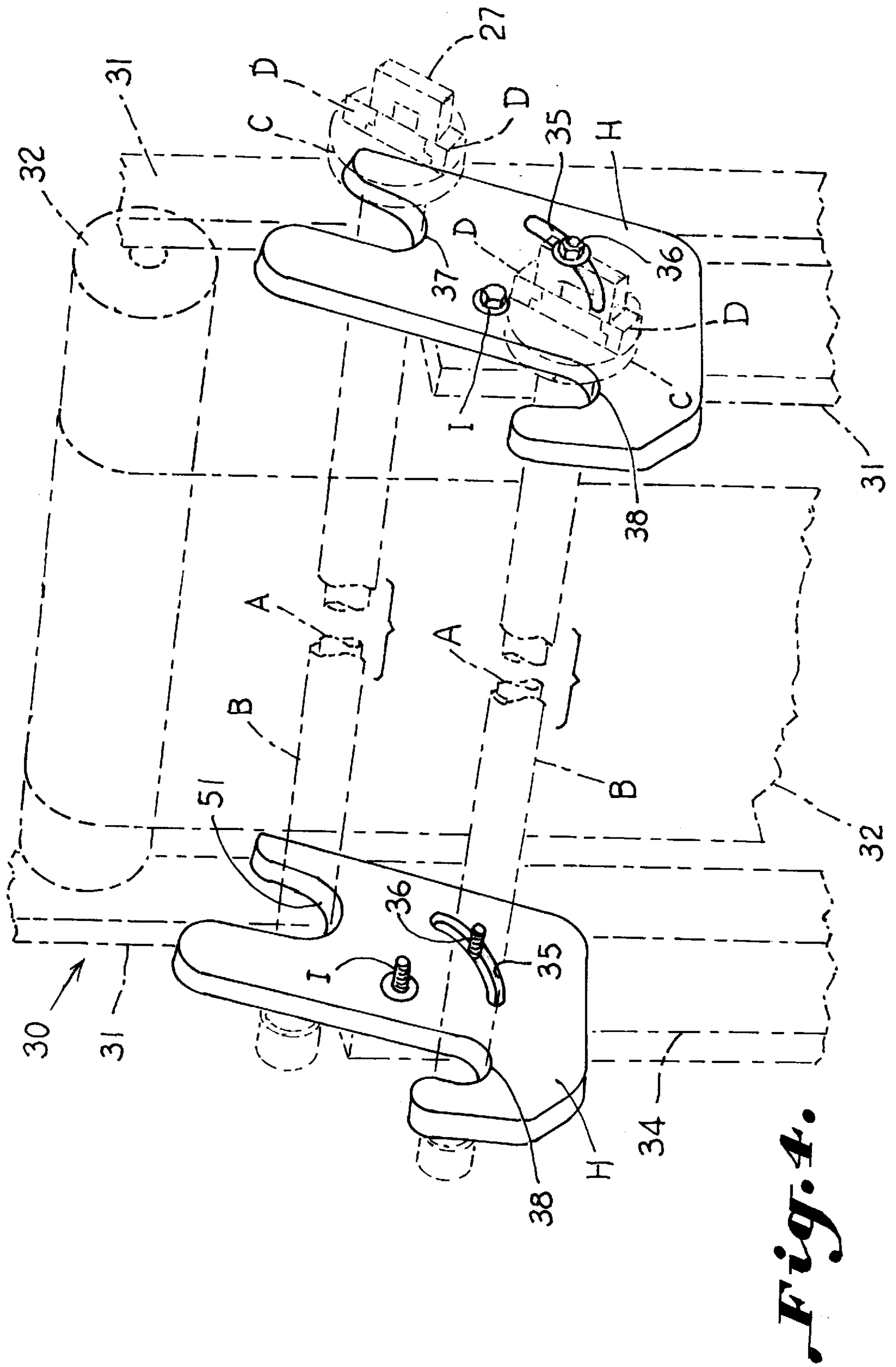
FIG. 4 is a perspective view illustrating a pair of elongated assemblies each comprising a single bar magnet constructed in accordance with the present invention carried in horizontal longitudinally spaced relation one above the other by brackets capable of effecting an adjustment of the width and attitude of the space between the bar magnets for permitting material to flow past the magnets but within their magnetic fields for removing magnetic material therebetween.

A pair of longitudinal transversely spaced brackets H are pivotally carried as at I for pivotal adjustment thereon so as to provide support members in horizontal alignment for positioning respective bar magnets A thereon (FIG. 4). Pivotal adjustment is provided to vary the spacing between the bar magnets.

It is important that a seal be achieved between the closure member E and a deformable ring positioned about an outer periphery of an open end through which a magnet is inserted into the housing. The closure member is urged against the deformable sealing rings by a compressive camming force achieved through the engagement of complementary surfaces of the fastening member and the bracket in order to exert a camming action or at least a wedging action sufficient to deform the sealing rings or at least effect a sealing relationship therewith. This is important because of the hostile environment in which the assemblies operate wherein particulate matter may be exceedingly small so as to tend to enter the housing thus contaminating the magnet or wherein entry may otherwise be gained by a contaminating ambient fluid whether liquid or gas.

Figure 1:
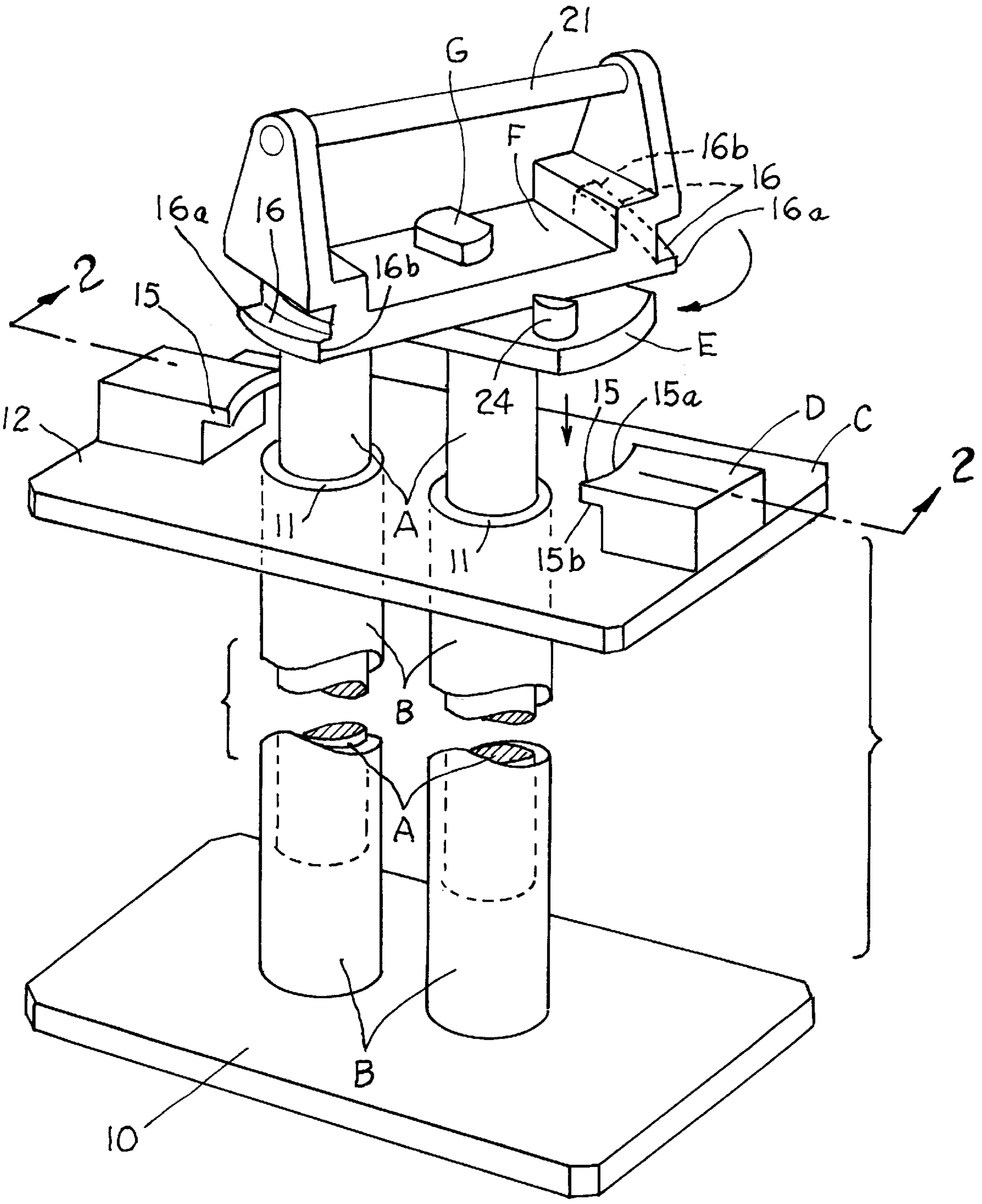
FIG. 1 is a perspective view illustrating an assembly for separating magnetic material, constructed in accordance with the invention, wherein closure apparatus for containing bar magnets within non-metallic housings is in open position preparatory to being closed by lowering and turning in the directions of the arrows for insuring a tight sealing closure of open ends of the housings.
Figure 2:
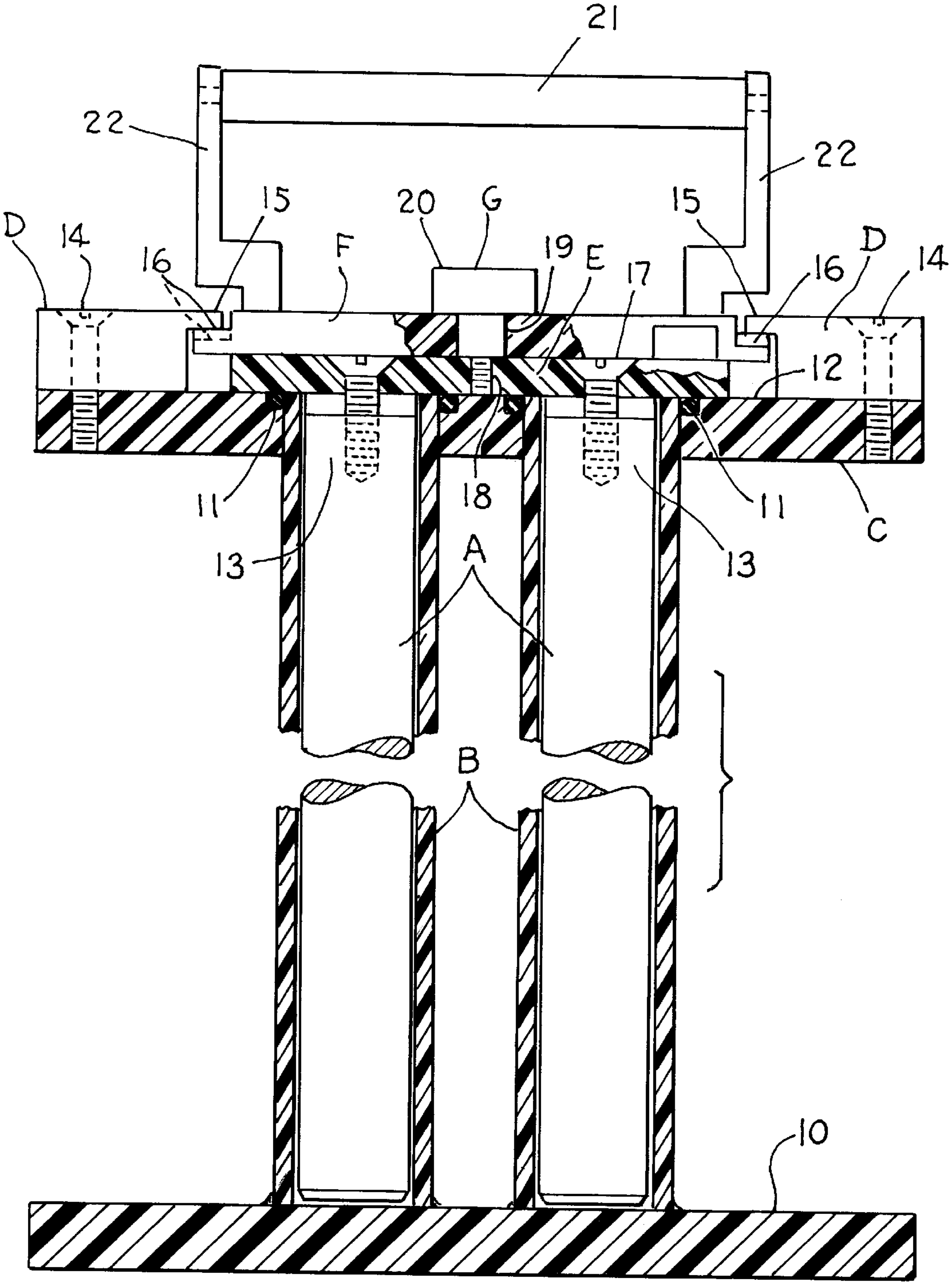
FIG. 2 is a transverse sectional elevation taken along the line 2—2 in FIG. 1 illustrating the components in closed sealed relation held by a camming action effected by lowering and turning a cam urging the closure member against a resilient sealing ring.

The elongated magnets A may be suitably constructed utilizing spaced disk magnets enclosed in sheaths of nonmetallic material such as stainless steel and ordered in desirable lengths as magnetic rods from several suppliers, including Master Magnetics, Inc., Castle Rock, Colo. The elongated bar magnets A are illustrated in FIGS. 1 and 2 as being carried in elongated housings B which include a bridging base member 10 carried at a closed base end of the housings of the assembly. The tubular housings B are carried in sealing relation to the base member. The end member C is illustrated as being rectangular and complementary the base member 10 and is fixed in sealing relationship about an open end of each of the elongated housings B so as to position sealing O-rings 11 (FIG. 2). The end member C has an upper surface 12 which carries opposed brackets D thereon on opposite sides of the open housing ends 13. The brackets D are suitably fixed upon the upper surface 12 of the end member C as by an adhesive or by threaded fasteners 14. The brackets D each have upper and inwardly projecting horizontal flanges 15 which have arcuate end members **15*a* as best illustrated in FIG. 1. The under surfaces 15*b* of the flanges are complementary to and engageable with opposed camming surfaces 16 carried by ends of the fastening member F for urging the closure operator member E into sealing engagement with the O-rings across the open ends of the housings B. The closure operator E is preferably fixed intermediate its ends as by screws 17 to respective bar magnets A. The fastening member F is illustrated as being rotatable upon a centrally disposed mounting member G which has fixed connection on one end at 18 with the closure member E providing a cylindrical surface 19 permitting rotation of the fastening member F upon the closure member E. An enlarged head 20** is carried by the centrally disposed mounting member G to facilitate disassembly of the related components described above.

A handle 21 is carried by opposed brackets 22 suitably fixed on fastening member F for rotating same to effect camming engagement to insure effective seal between the closure member and the open end of the housings B. It will be noted by reference to FIG. 1 that camming is effected by the surfaces 16 which extend upwardly from a reduced end **16*a* to a higher end portion 16*b* on each side. The respective camming surfaces 16 face in opposite directions as illustrated to effect closure no matter which magnet is in a respective housing. By forcefully lowering the closure member E and the fastening member F and by rotating the fastening member F, a sealing engagement is achieved by rotating same producing a camming action for compressibly and deforming the resilient deformable O-rings 11. An upright stop member 24 is illustrated as being carried adjacent one remote corner of the closure member E to stop the rotation of the fastening members fixing same in a closed position with the surfaces 15*b* and 16** fully engaged. Preferably, the components other than the fasteners described are constructed of plastic such as polyvinyl chloride so as to afford a limited flexing action facilitating the camming action described above. If high temperatures are to be encountered by the apparatus hereof non-magnetic material such as stainless steel may be utilized where indicated.

A wiping action is achieved at the lower surface of the end member C when the magnets are withdrawn from the housings B so as to clean the housings of magnetic material collected thereon. This action is more fully described in U.S. Pat. Nos. 5,427,249 and 5,470,466 referred to above and made a part hereof by reference.

Figure 3:
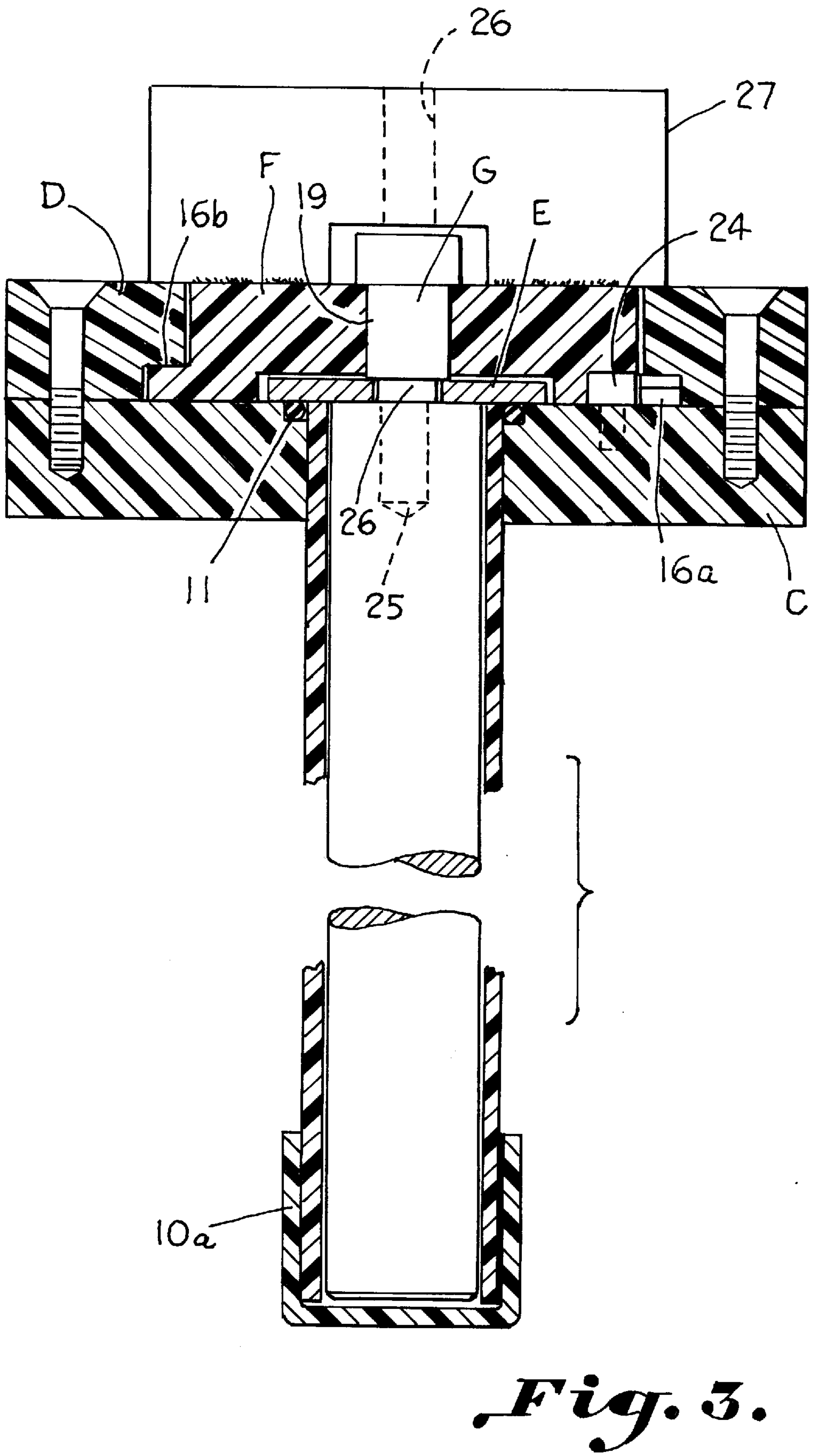
FIG. 3 is a sectional elevation similar to FIG. 2 but illustrating a modified form of the invention wherein a single bar magnet is enclosed within a single tubular housing with modified closure apparatus.

Referring more particularly to FIG. 3, a modified form of the invention is illustrated wherein a single housing B is provided for containing a single elongated magnet A. The mounting member G is illustrated as being fixedly connected to the magnet B as at 25 and as providing a cylindrical surface 26 to permit rotation of the closure operator member E thereon. The fastening member F is rotatable on the cylindrical portion 19 and an opening to permit entry to suitable tool is illustrated at 26 in the handle 27 which is servicing fastened to the upper surface of the fastening member F. A suitable stop member 24 is provided to limit the rotation of the fastening member F. If desired, the closure operator E may be integral with the fastening member F (not shown) and the stop member 24 may be omitted especially if a satisfactory camming or wedging action can be achieved for positioning the fastening member and closure member in sealing position. A seal may then be achieved between a lower surface of the closure member E which may be an extension of the fastening member F integral therewith as desired. In the event the members E and F are integrally fixed in relation to each other, the mounting member G may be modified. FIG. 3 illustrates the provision of an end cap **10*a* in lieu of the base member illustrated at 10 in FIGS. 1 and 2**. The end cap may be a fixture such as is often utilized to close pipe ends.

Referring to FIG. 4, mounting mechanism is illustrated in accordance with the invention positioned, for example, at the back of a cloth inspection apparatus as illustrated in broken lines broadly designated at 30. The inspection apparatus includes frame members 31 which carry a horizontal roll 32. A run of cloth 32 and is passed behind the roll and thence between elongated horizontally disposed magnets A carried in housings. The brackets H are illustrated as being disposed longitudinally and in horizontal alignment with one another and pivotally mounted at I. The brackets H are suitably carried by mounting brackets 34 secured to the respective frame members 31. An arcuate guide 35 is provided in each of the brackets H and a threadable fastener 36 is provided for fixing the inclination of the brackets in a vertical plane to adjust the distances between the bar magnets A. Each of the brackets H have support members 37 and 38 each having an open top entranceway in horizontal alignment for receiving and positioning by gravity the bar magnets for easy manual removal by lifting and without the necessity of manipulating other fastening means. The support members 37 and 38 are preferably carried in the brackets at different levels to aid in adjusting the size and orientation of the opening. The bar magnets may preferably be provided with housings B as illustrated in FIG. 4 and are provided with end members C carrying opposed brackets D for fixing closure such as described above in FIG. 3. The cloth web is illustrated as passing the magnets in a generally vertical run but divided or particulate material may pass by gravity flow.

It is thus seen that easily cleanable apparatus for separating magnetic material has been provided wherein closure members may be securely and effectively sealed permitting use of the bar magnets for separating magnetic material in the most inhospitable of environments. A mounting structure has been provided for adjustably positioning elongated magnets whether enclosed within housings or rotatable for adjusting the horizontal spacing therebetween to fulfill the requirements for passing material therebetween for removing magnetic components therefrom.

While a preferred embodiment of the invention has been described using specific terms, such description is for illustrative purposes only, and it is to be understood that changes and variations may be made without departing from the spirit or scope of the following claims.

What is claimed is:

1. Apparatus for separating magnetic material comprising:

at least one elongated bar magnet;

a tubular housing for containing the elongated bar magnet constructed from non-magnetic material;

an end member fixed to the housing extending about an open end of the tubular housing;

opposed brackets carried by said end member with the open end of the tubular housing therebetween;

a closure member extending across the open end of the tubular housing; and a fastening member carried by said bar magnet for rotation into and out of engagement between said opposed brackets for retaining said closure member across the open end of the tubular housing.

2. The structure set forth in claim 1 including resilient deformable seal about said open end, and camming surfaces carried by respective ends of said fastening member.

3. Apparatus for separating magnetic material comprising:

at least one elongated bar magnet;

a tubular housing constructed from non-magnetic material for containing the elongated bar magnet;

an end member fixed to the housing extending in sealed relation to said housing defining an open end of the tubular housing presenting a marginal outer surface;

opposed brackets carried by the end member on the marginal surface with an open end of the tubular housing therebetween;

a closure member fixed to said bar magnet presenting an inner surface extending across said open end of the tubular housing;

a movable fastening member engaging said opposed brackets retaining said closure member across said open end of the tubular housing; and a mounting member carrying said fastening member for rotation from a position wherein said fastening member engages said brackets to a position wherein said fastening member is free of engagement with said brackets permitting withdrawal of said bar magnet from said tubular housing.

4. The structure set forth in claim 3 wherein a single housing carries said end member for reception of an elongated magnet, and wherein said closure member and said movable fastening member are fixally joined.

5. The structure set forth in claim 3 wherein a plurality of spaced housings are carried by said end member for receiving respective elongated magnets.

6. The structure set forth in claim 5 wherein said mounting member is fixed to said magnets and said closure member permitting rotation of said fastening member thereon.

7. The structure set forth in claim 3 including a deformable sealing member carried by said end member about said open end of said housing.

8. The structure set forth in claim 7 including a handle carried by said fastening member, and camming surfaces carried at ends of said fastening member engaging said brackets.

9. The structure set forth in claim 8 including a stop member carried by said end member limiting rotation of said fastening member.

10. A method for separating magnetic material from non-magnetic material comprising the steps of:

positioning at least one elongated bar magnet in a tubular housing constructed from non-magnetic material for containing the elongated bar magnet;

fixing an end member to the housing in sealed relation to said housing defining an open end of the tubular housing presenting a marginal outer surface;

securing a closure member to the bar magnet presenting an inner surface for extending across said open end of the tubular housing; and rotating a fastening member from a position wherein said fastening member engages opposed brackets carried by the end member fixing said inner surface of the closure member across the open end of the tubular housing to a position wherein the fastening member is free of engagement with the brackets permitting withdrawal of the bar magnet from the tubular housing.

11. The method set forth in claim 10 including the steps of lowering said fastening member, and exerting a camming action by rotating same comprising a deformable, resilient sealing member encompassing said open end of said housing.

12. The method set forth in claim 11 including the steps of mounting said fastening member for rotation about a central location for rotating same for securing said closure member across a plurality of housings containing respective bar magnets.

* * * * *